Jan. 11, 1966    D. E. BECKETT ETAL    3,228,728
UNLOADING SYSTEM AND APPARATUS
Filed July 1, 1963    5 Sheets-Sheet 1

INVENTORS
DONALD E. BECKETT
ROBIN K. BECKETT
BY
Kinney & Schenk
ATTORNEYS

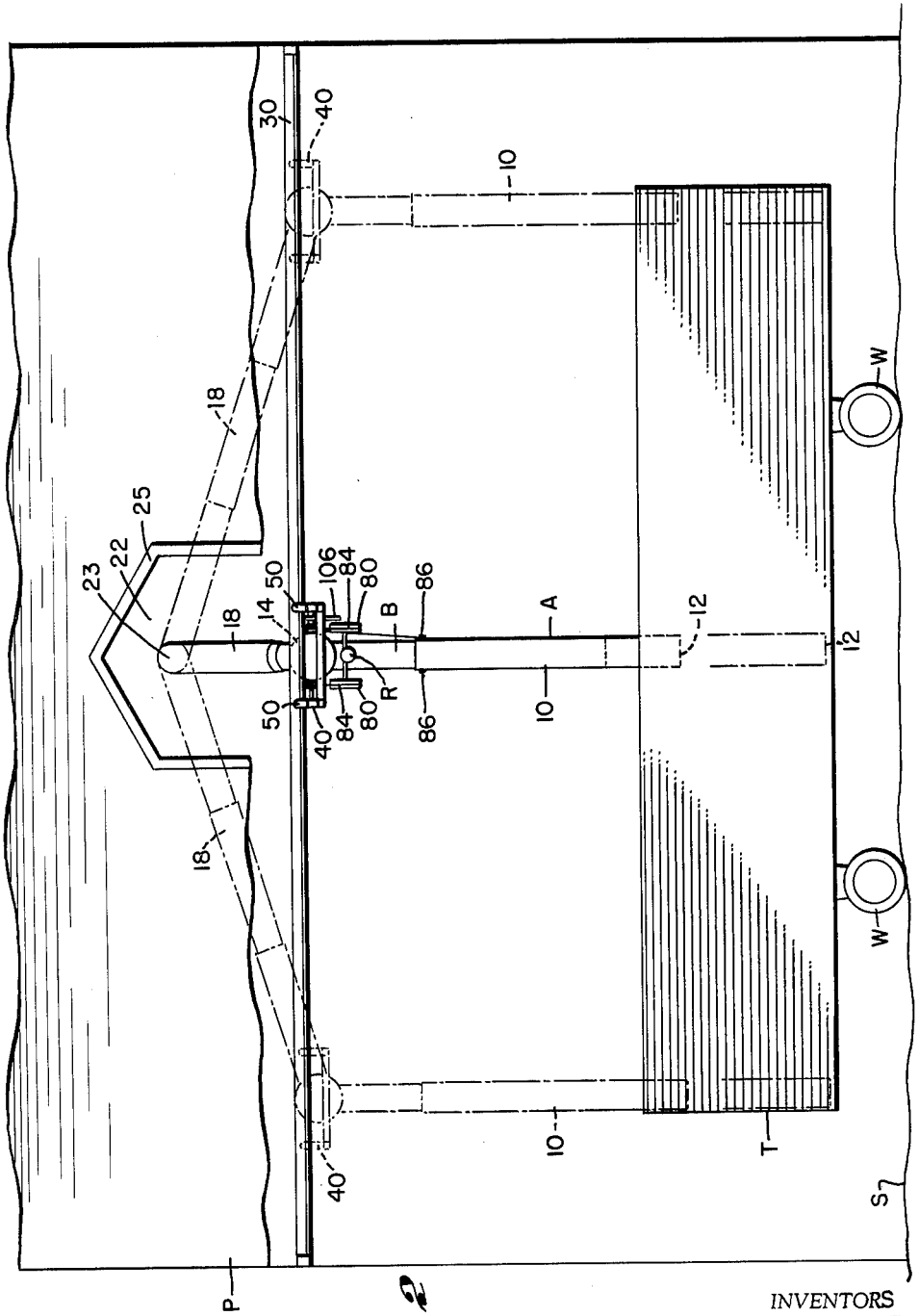

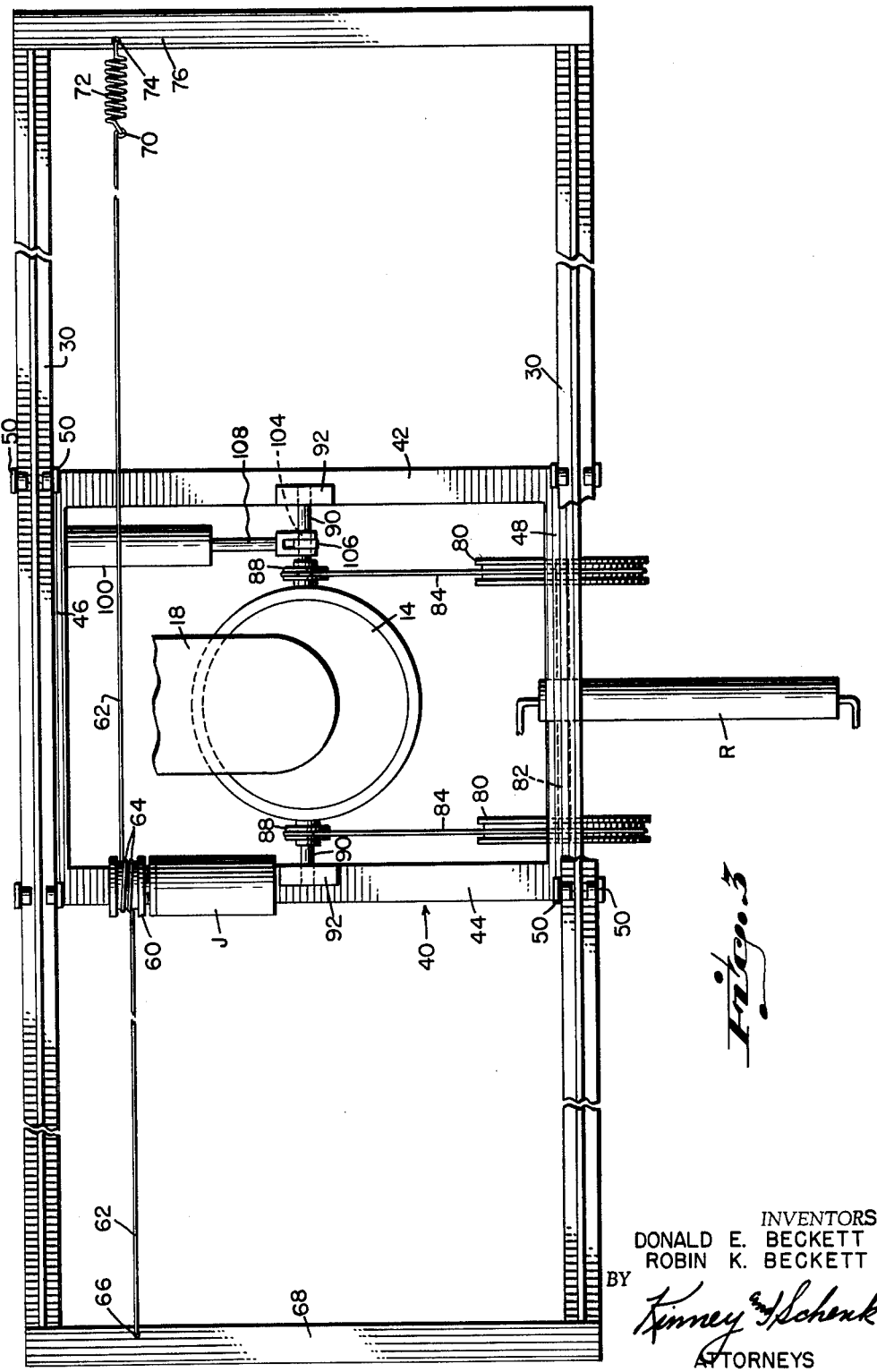

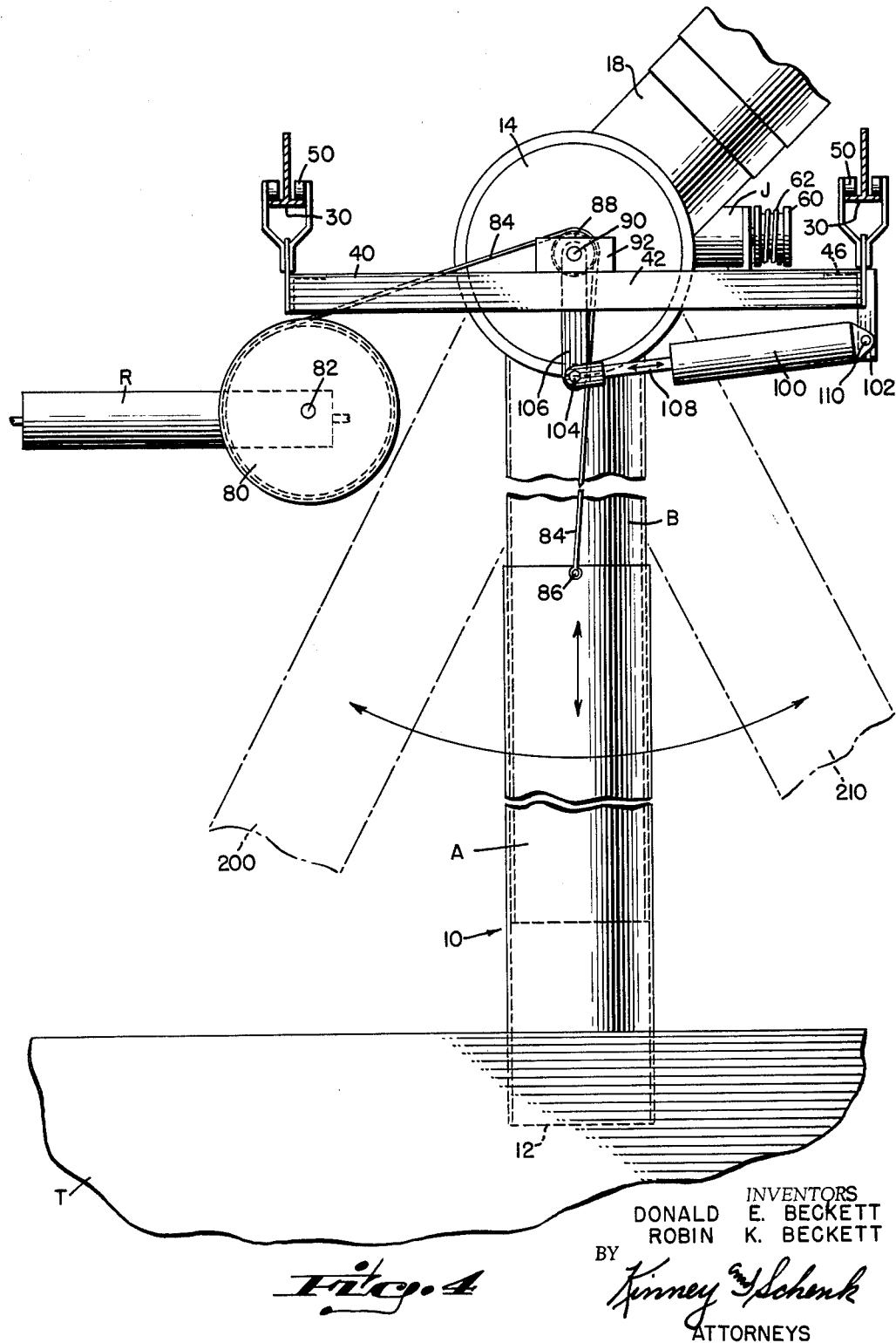

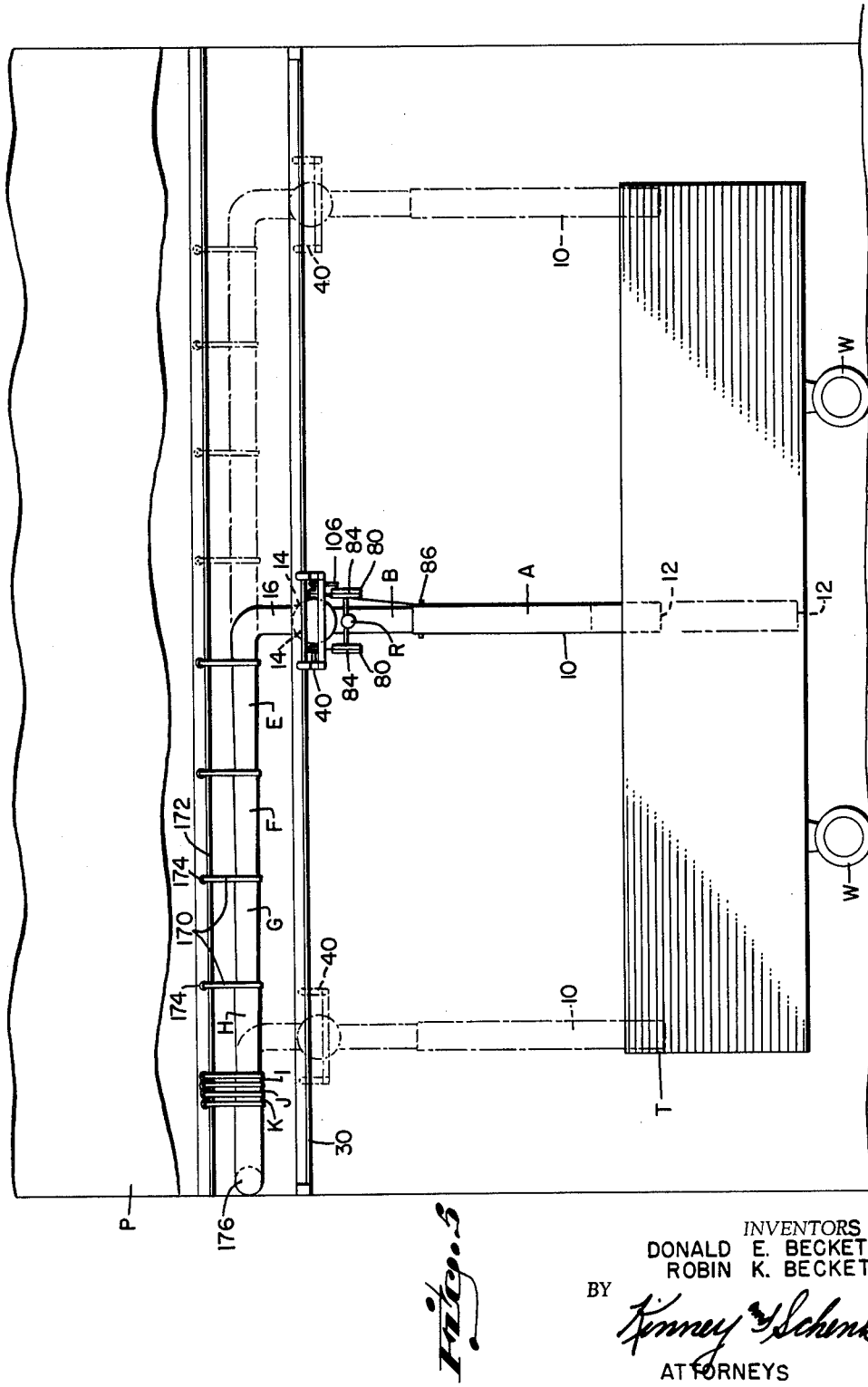

United States Patent Office 3,228,728
Patented Jan. 11, 1966

3,228,728
UNLOADING SYSTEM AND APPARATUS
Donald E. Beckett and Robin K. Beckett, Wilmington, Ohio, assignors to Beckett-Harcum Company, Wilmington, Ohio, a corporation of Ohio
Filed July 1, 1963, Ser. No. 291,652
9 Claims. (Cl. 302—34)

This invention relates to a pneumatic unloading system, and more particularly to a suction system and apparatus for enabling an operator to efficiently unload cotton bolls or the like from large open topped containers such as truck bodies or trailers.

An object of the invention is to provide simple yet highly effective means for enabling an operator to control and direct the location of the intake-end of a produce-intake pipe throughout all portions of a truck body or other container, whereby the truck or other container need not be moved during the unloading operation.

Another object of the invention is to provide a simple yet highly effective means for enabling an operator to swing the intake end of a suction pipe both longitudinally and transversely of a centrally disposed mounting or suspension area and for likewise selectively elevating and/or lowering the intake for facilitating the effective removal of bulk material from a truck body or other container.

A further object of the invention is to provide means for mounting a suction-line-supporting trolley for movement along elevated rails, and for enabling an operator to effectively and positively control the motion of the trolley relative to the rail.

Still a further object of the invention is to provide novel means for effecting the telescopic extension and/or raising of the suction pipe, from a remote control station.

Another object of the invention is to provide novel means for supporting the intake-end of the suction line of a pneumatic unloading system whereby to facilitate of the unloading of a truck body or other container and transfer the unloaded material directly to another location where the product will be further processed and/or stored.

These and other objects are attained by the means disclosed herein and illustrated upon the accompanying drawings, in which:

FIG. 1 is an end elevational view of a typical installation along the side of a gin house showing the subject invention associated with a truck whose contents are to be unloaded.

FIG. 2 is a side elevational view of FIG. 1.

FIG. 3 is a top plan view of the rail, trolley and suction-pipe supporting mechanism.

FIG. 4 is an enlarged side view of the suction pipe support, comprising a detail of the invention.

FIG. 5 is a view similar to FIG. 2 but illustrating a modified form of suction-pipe mounting.

FIG. 6 is a diagrammatic view of a typical switch for controlling the raising and lowering of the suction pipe.

FIG. 7 is a diagrammatic view of a four-way single-lever switch for controlling traverse of the trolley along its supporting rail, and/or swinging the suction pipe in a plane normal thereto.

With the advent of automatic cotton-picking equipment the problem of effectively handling the picked cotton and delivering same to a gin has become acute; the bottleneck being at the location where the trucks of cotton are unloaded at the gin.

The present invention is directed to a highly efficient, compact, foolproof mechanism for enabling a single, unskilled operator to quickly remove the entire contents of a cotton truck, or other container whereby the cotton is continuously delivered to the ginning equipment.

Heretofore it has been common practice to utilize a grossly inefficient form of suction means for unloading cotton from a truck, said suction means comprising a pipe the intake end of which was guided manually by one or more operators standing on or in the cotton, while other workmen performed other phases of the unloading procedure.

With particular reference to the drawings, the numeral 10 denotes generally a suction pipe having an intake end or snout 12. The other end of the pipe terminates in a swivel joint 14 having an outlet 16 which is in open communication with a telescopic main conveyor pipe or conduit 18 which, in the preferred construction enters gin building 20 through wall 22 thereof.

The contents of a truck T supported on wheels W which engage supporting surface S, is adapted to be unloaded via pipe 10 to main conveyor pipe 18 by means of the device which comprises the subject matter of the present invention.

The numerals 30 denote a pair of parallel laterally spaced overhead track members which are suitably suspended and fixed an appreciable distance above truck T but below the projecting roof P of the gin house. As best illustrated in FIG. 3, a carriage 40 comprising laterally spaced transverse frame members 42 and 44, and longitudinal frame members 46 and 48, is suspended by trolleys 50 from tracks 30 for thereby mounting the carriage for endwise or longitudinal movement above truck T, and along tracks 30.

Movement may be imparted to carriage 40 by means of a rotatable pulley 60 mounted upon the carriage and around which a cable 62 is wound a time or two as at 64. One end of the cable may be secured as at 66 to a fixed transverse frame member 68, whereas the other end of the cable may be secured as at 70 to one end of spring 72, the other end of which is anchored as at 74 to the opposite stationary frame member 76. The letter J denotes an air, hydraulic or electric motor on the carriage capable of imparting selective rotation to pulley 60 in either of two directions, whereby carriage 40 will be positively propelled along rails 30 by the progressive winding and unwinding action of the cable upon pulley 60.

With particular reference now to FIG. 4, the numeral R denotes generally a source of power for imparting selective rotation to a pair of pulleys 80 which are secured to and carried by a rotatable shaft 82 of power mechanism R. One end of a cable 84 is wrapped around pulley 80, the other end of said cable being secured to the lower section A of the suction pipe 10 as at 86, cable 84 passing over pulley 88 which is carried by shaft 90 suitably journaled in bearings 92 supported on transverse members 42 and 44. In the preferred embodiment of the invention shaft 90 is disposed in substantial vertical alignment with connector 86, and two cables 84 are employed, one at each side of the suction pipe (FIG. 3).

At this point it should be noted that outer or lower pipe A is adapted to slidably engage inner or upper pipe B.

When drive pulleys 80 are turned in a clockwise direction, as seen in FIG. 4, cables 84 will be advanced for permitting lower section A of suction pipe 10 to move downwardly relative to section B. A counter clockwise rotation of drive pulleys 80 will elevate section A relative to and over section B for raising intake end 12 of suction pipe 10.

With further reference to FIG. 4, it will be noted that a cylinder 100 is provided intermediate a depending bracket member 102 carried by side member 46 of the carriage, and the lower end 104 of lever 106. The piston rod 108 of cylinder 100 is secured to the lower end of lever 106 as at 104 whereas the other end of cylinder 100 may be secured as at 110 to bracket 102. Lever 106 is secured to that portion of movable joint 14 to which the upper end of section B of suction line 10 is secured, whereby rocking movement of lever 106 about pivotal connection 90 will cause the composite suction pipe 10 to be swung between the forward and rearward positions indicated by the numerals 200 and 210 respectively. In those instances in which the various drive motors and cylinders are pneumatically or hydraulically actuated, suitable solenoid-actuated valves may be utilized which may be remotely controlled from two electrical switches such as are illustrated conventionally in FIGS. 6 and 7. In FIG. 6 the numeral 120 denotes a switch arm which is adapted to be positioned between or in contacting relationship with one or the other of electrical contacts 122 and 124 for thereby completing an electrical circuit through arm 120 and conductor 126 to conductor 128 or 130, it being understood that when a circuit is closed through conductor 128, motor J will be rotated whereby to advance carriage 40 to the left, FIG. 3. Conversely, completion of a circuit through conductor 130 will actuate motor J to move the carriage to the right. When contact 120 is in nonconducting relationship with contacts 122 and/or 124, carriage 40 will be securely immobilized against accidental or unintentional movement along tracks 30.

In FIG. 7 contact arm 140 when engaging contact 142 will complete an electrical circuit to cause motor R to rotate pulley 80 in a counter clockwise direction as viewed in FIG. 4, for elevating section A of the suction pipe 10 relative to section B. Section A will be lowered when contact arm 140 engages contact 144. When contact arm 140 engages contact 146, cylinder 100 will be actuated for swinging the suction pipe 10 to the left, as viewed in FIG. 4, whereas movement of contact arm 140 to engage contact 148 will cause cylinder rod 108 to be retracted for swinging the suction pipe to the right.

With reference now to the modification, FIG. 5, it will be noted that outlet pipe 16 of the universal connector 14 is in open communication with the endmost section E of a plurality of telescopically adjustable sections F, G, H, I, J and K each of which is suspended by means of hangers 170 from a track 172 disposed centrally of and above tracks 30. Hangers 170 include wheels 174 which engage and are suspended from horizontally projecting portions of track 172. In FIG. 2, pipe 18 enters the gin house wall 22 at 23 beneath the dog house roof portion 25 and intermediate the ends of track 30. In FIG. 5, the pipe enters the gin house at 176 beyond one end of track 30; however, it should be understood that whether the modification of FIG. 2 or 5 be utilized, the actuating mechanism for raising, lowering and swinging the suction pipe, and/or transporting or imparting movement to carriage 40 is substantially as illustrated in FIGS. 3 and 4.

FIGS. 2 and 5 illustrate, by means of broken lines, the extreme positions of carriage 40 and its depending suction pipe at opposite ends of the mobile container T. These views show also how the main suction pipe 18 extends telescopically as the carriage is shifted toward the extreme positions along tracks 30. Elevated and lowered positions of snout 12 relative to the mobile container bottom are indicated also.

The track structure 30 which supports carriage 40 may be erected or suspended in any suitable manner, depending upon the construction of the gin house. For example, if the roof overhang P or the adjacent side wall of the gin house are found structurally capable, these elements of the house may be utilized to suspend the track structure; otherwise the track structure may be mounted upon suitable ground-supported masts or scaffolding designed to offer no interference with the movement of trucks T beneath the unloading apparatus. In any event, the track structure 30 is to be a stationary structure.

The control means for motors R, J, and 100, exemplified by the electric switches of FIGS. 6 and 7, may be situated at any convenient location from which an operator may observe the movements of suction snout 12 during the unloading procedure. Unlike the practice heretofore employed, the operator need not and preferably will not be stationed within truck T and amongst the cotton bolls therein contained. One operator properly stationed outside the truck is thereby enabled to perform the services heretofore requiring several laborers.

As previously mentioned herein, the several motors employed for actuating the unloading apparatus may be electric motors, or motors operated hydraulically or pneumatically or otherwise, with the controls thereof situated wherever an operator may most conveniently and effectively direct the unloading operation.

It is to be understood that various modifications and changes may be made in the structural details of the apparatus, within the scope of the appended claims, without departing from the spirit of the invention.

What is claimed is:

1. Apparatus for unloading light weight bulk material from a container, comprising in combination an overhead elongate track structure beneath which a container of bulk material may be located for unloading, a carriage supported on and movable along the track structure longitudinally of the latter and including transverse members, a suction pipe, a hollow swivel joint unit between said transverse members and having an end of the suction pipe connected thereto, the swivel joint having an outlet for connection to suction means, pivot means operatively coupling said swivel joint with said carriage transverse members and suspending the swivel joint and the suction pipe for swinging movement transversely of the track structure, power means mounted on said carriage operatively coupled with the swivel joint for effecting the said swinging movement thereof, carriage moving power means mounted on the carriage, a driving connection between said carriage moving power means and the track structure for effecting movement of the carriage on the track structure, a suction snout extending concentrically from the other end of the suction pipe and axially movable thereon for changing the effective length of the suction pipe, and other power means mounted on the carriage and operatively connected to said snout for effecting movement of the latter axially of the suction pipe, the said driving connection between said carriage moving power means and the track structure embodying a cable pulley connected to and rotated by the carriage moving power means, and a cable wrapped at least one time around said pulley and having its opposite ends connected to opposite ends of said elongate track structure.

2. Apparatus for unloading light weight bulk material from a container, comprising in combination an overhead elongate track structure beneath which a container of bulk material may be located for unloading, a carriage supported on and movable along the track structure longitudinally of the latter and including transverse members, a suction pipe, a hollow swivel joint unit between said transverse members and having an end of the suction pipe connected thereto, the swivel joint having an outlet for connection to suction means, pivot means operatively coupling said swivel joint with said carriage transverse members and suspending the swivel joint and the suction pipe for swinging movement transversely of the track structure, power means mounted on said carriage operatively coupled with the swivel joint for effecting the said swinging movement thereof, carriage moving power means mounted on the carriage, a driving connection between said carriage moving power means and the track structure for effecting movement of the carriage on the track structure, a suction snout extending concentrically from the other end of the suction pipe and axially movable thereon for changing the effective length of the suction pipe, and other power means mounted on the carriage and operatively connected to said snout for effecting movement of the latter axially of the suction pipe, said pivot means comprising shafts carried by said swivel joint and mounted in supporting bearings on the carriage, the said power means mounted on the carriage and operatively coupled with the swivel joint embodying a fluid actuated motor having a fluid cylinder pivotally attached at one end to the carriage and having a piston shaft extending from its opposite end and a lever arm secured to a swivel joint carried shaft.

3. Apparatus for unloading light weight bulk material from a container, comprising in combination an overhead elongate track structure including spaced track members beneath which a container of bulk material may be located for unloading, a carriage frame including longitudinal and transverse members, trolley means suspending said frame from said track members for movement along the track structure longitudinally of the latter, a suction pipe, a hollow swivel joint unit positioned within the frame and having an end of the suction pipe connected thereto, the swivel joint having an outlet for connection to suction means, shaft elements pivotally connecting the swivel joint unit to transverse members of said carriage frame and suspending the swivel joint unit and the suction pipe for swinging movement transversely of the track structure, a power means mounted on a member of said carriage frame and operatively coupled with the swivel joint unit for effecting the said swinging movement of the latter, carriage moving power means mounted on the carriage, a cable drive connection between said carriage moving power means and remote points on and spaced apart longitudinally of the track structure for effecting movement of the carriage on the track structure, a suction snout extending concentrically from the other end of the suction pipe and axially movable on the latter for changing the effective length of the suction pipe, and other power means mounted on the carriage and operatively connected to said snout for effecting raising and lowering movements of the latter axially on the suction pipe.

4. The invention according to claim 3, wherein the said cable moving power means comprises a motor having a rotary shaft and a cable drum thereon and having the said cable drive wrapped at least one time around said drum and said cable drive connection with at least one of said remote points including a contractile spring.

5. The invention according to claim 3, wherein the said operative connection between said other power means and said snout comprises pulleys rotatably supported on said shaft elements, other pulley rotatably supported by said carriage below one longitudinal side of the track structure and each aligned with one of said shaft element carried pulleys and driven by said other power means and cables connected with said driven pulleys and extending therefrom to and over the pulleys carried by said shaft elements and then extending downwardly from the latter to and being attached at opposite sides to said suction snout.

6. The invention according to claim 3, wherein the said power means mounted on the carriage and operatively coupled with the swivel joint unit embodies a fluid actuated motor having a fluid cylinder having an outer end pivotally attached to a longitudinal member of the carriage frame and having a piston shaft extending from its other end, a lever arm secured to a shaft element and extending downwardly therefrom, and a pivotal connection between the lower end of said lever arm and said piston shaft.

7. Apparatus for unloading lightweight bulk material from a container, comprising an overhead elongate track structure beneath which a container of bulk material may be located for unloading, a carriage extending across the track structure, means carried by the carriage engaging the track structure and supporting the carriage for movement longitudinally of the track structure, the carriage including transverse members spaced apart in the longitudinal direction of the track structure, a suction pipe, a hollow swivel joint unit positioned in the space between said transverse members, pivot means attached to the swivel joint unit and extending transversely thereof and rotatably coupled to said transverse members to swing on an axis substantially perpendicular to the transverse members, said swivel joint unit having an end of said suction pipe connected thereto, the swivel joint unit having an outlet for connection to suction means, the suction pipe being suspended from the swivel joint unit to swing therewith on said axis in a plane transversely of the track structure, a motor supported on the carriage and having operative connection with the swivel joint unit for effecting the said swinging of the latter on said axis, a carriage moving motor supported on the carriage, a rotatable power transmitting member operatively connected to said carriage moving motor to be rotated thereby, an elongated element extending longitudinally of the track structure across said transverse members of the carriage, said elongated element having opposite ends secured to the track structure at opposite ends of the latter, means forming a driving connection between said elongate element and said rotatable power transmitting member, said carriage moving motor being capable of imparting selective rotation to said power transmitting member for effecting back-and-forth movement of said carriage, a suction snout extending from the other end of the suction pipe and movable axially of the suction pipe for varying the effective length of the latter, and other motor means supported on the carriage and operatively connected to said snout for effecting movement of the latter axially of the suction pipe.

8. The invention according to claim 7, wherein said track structure comprises spaced parallel track members, and said means carried by the carriage for supporting the carriage from the track structure comprises trolleys mounted on the track members and suspending the carriage therefrom.

9. The invention according to claim 7, wherein said pivot means comprises aligned shaft elements extending from opposite sides of the swivel unit, the first said motor including a reciprocable element positioned to reciprocate in a path perpendicular to a shaft element, and said operative connection of the first said motor embodying a lever arm carried by said shaft element and pivotally coupled to said reciprocable element.

References Cited by the Examiner
UNITED STATES PATENTS

| 1,918,133 | 7/1933 | Rennels | 302—34 |
| 3,088,779 | 5/1963 | Vachon | 302—61 |

SAMUEL F. COLEMAN, *Primary Examiner.*

ANDRES H. NIELSEN, *Examiner.*